US011589002B2

(12) United States Patent
Baney et al.

(10) Patent No.: US 11,589,002 B2
(45) Date of Patent: Feb. 21, 2023

(54) WEBCAM WITH IMPROVED USER ENGAGEMENT AND DISPLAY VISIBILITY

(71) Applicants: Barbara Baney, Los Altos, CA (US); Douglas M Baney, Los Altos, CA (US)

(72) Inventors: Barbara Baney, Los Altos, CA (US); Douglas M Baney, Los Altos, CA (US)

( * ) Notice: Subject to any disclaimer, the term of this patent is extended or adjusted under 35 U.S.C. 154(b) by 0 days.

(21) Appl. No.: 17/521,282

(22) Filed: Nov. 8, 2021

(65) Prior Publication Data

US 2022/0201244 A1    Jun. 23, 2022

Related U.S. Application Data

(60) Provisional application No. 63/129,317, filed on Dec. 22, 2020.

(51) Int. Cl.
*H04N 7/14* (2006.01)
*H04N 5/232* (2006.01)

(52) U.S. Cl.
CPC ......... *H04N 7/144* (2013.01); *H04N 5/23241* (2013.01)

(58) Field of Classification Search
CPC ........... H04N 5/23241; H04N 5/23293; H04N 7/144; H04N 5/225
USPC .............................. 348/49, 50, 207.1, 207.11
See application file for complete search history.

(56) References Cited

U.S. PATENT DOCUMENTS

| 4,928,301 A | 5/1990 | Smoot | |
| 9,392,219 B2 | 7/2016 | Robinson | |
| 9,823,694 B2 | 11/2017 | Evans, V | |
| 9,864,400 B2 | 1/2018 | Evans, V | |
| 9,870,024 B2 * | 1/2018 | Evans, V | .......... H01L 27/14621 |
| 10,838,468 B2 * | 11/2020 | Bikumala | .......... H01L 51/5234 |

* cited by examiner

*Primary Examiner* — Yosef K Laekemariam
(74) *Attorney, Agent, or Firm* — Shalini Venkatesh

(57) ABSTRACT

A webcam apparatus, having a display surface characterized by a display area, includes an image capture device characterized by an optical axis and a first footprint in a plane perpendicular to the optical axis; and an energy transfer device with a first portion coupled to the image capture device; and a second portion allowing attachment to an edge of a display screen. When attached, the image capture device and the first portion lie against and in contact with the display surface, or in a proximate and parallel plane. An optical axis characterizing the image capture device is aligned with a gaze direction of a user addressing a viewer via the captured images. The first portion of the energy transfer device is transparent at optical wavelengths, and has a second footprint in the plane perpendicular to the optical axis. The first and second footprints are small relative to the display area.

20 Claims, 5 Drawing Sheets

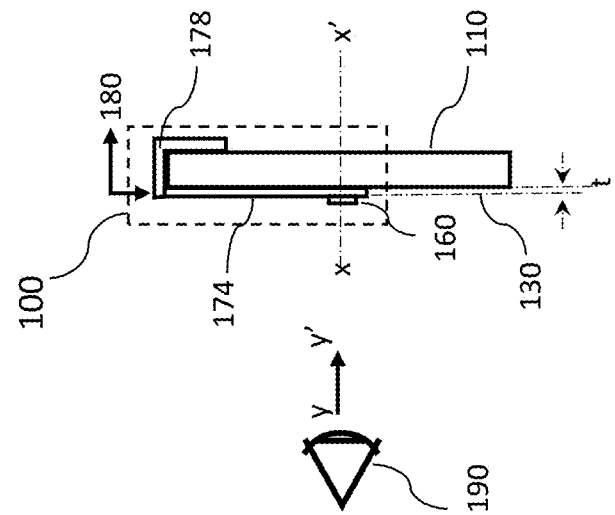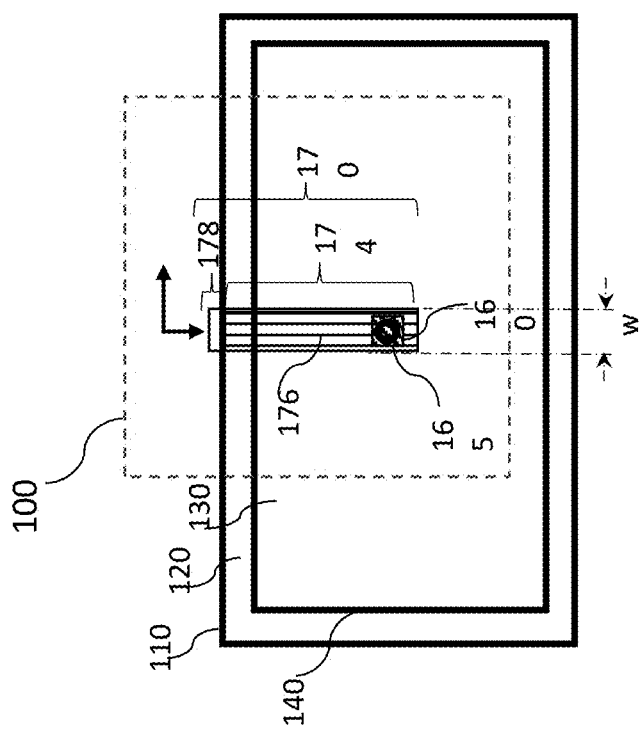
Fig. 1

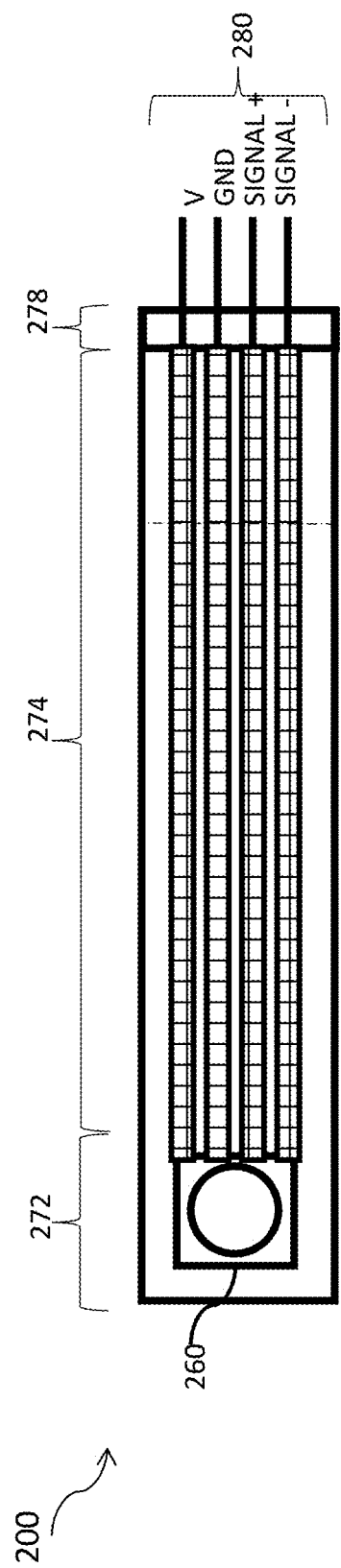
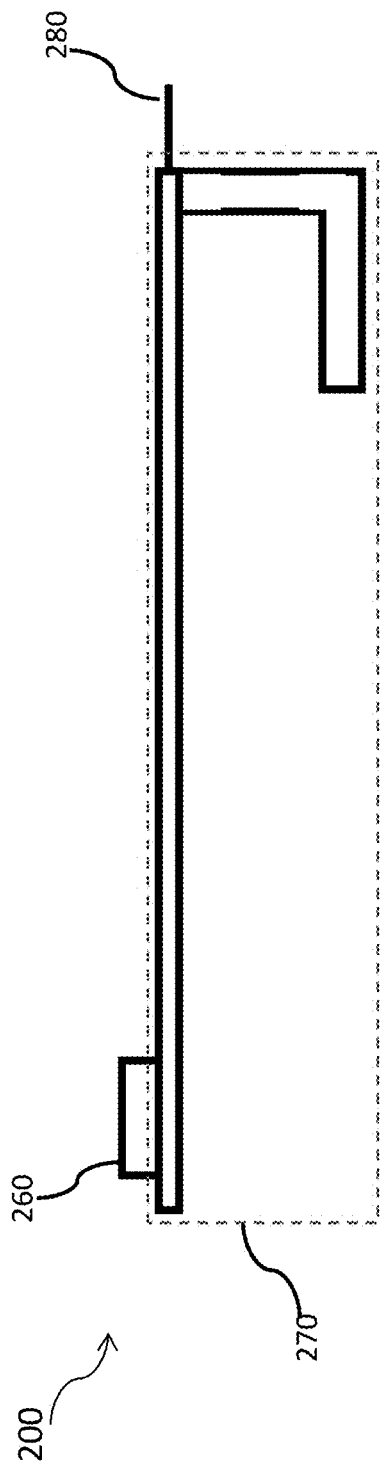

WEBCAM WITH IMPROVED USER ENGAGEMENT AND DISPLAY VISIBILITY

CROSS REFERENCE TO RELATED APPLICATION

This application claims the benefit of U.S. Provisional Patent Application Ser. No. 63/129,317, filed on Dec. 22, 2020, which is hereby incorporated by reference as if set forth in full in this application for all purposes.

BACKGROUND

Webcams are routinely employed to facilitate engagement in meetings between participants who are not co-located. Information is shared on a display, generally in the form of a real-time image stream, but sometimes as a recorded image stream, showing the face and part of the torso of a person—the human subject—interacting with one or more others at that moment, or at a later time in the case of a recorded presentation, "through" the webcam. At its simplest, a webcam is an apparatus that captures video images, encodes the images in electrical signals, and provides them for transmission. A webcam often includes additional functionality, such as capturing audio, particularly of speech by the person addressing the webcam, and still images.

The core component of a webcam is a camera, typically composed of a lens and a sensor array that capture an optical image and convert the image into electrical signals, using technology well known in the art. Often, other participants in the meeting may use their own webcams at their own locations, so that as well as simply viewing video streams provided by one or more of the other webcams, they may themselves be secondary subjects, being imaged as they "face" others using their own webcam.

In many cases, at least the camera of the webcam is integrated into the display screen, during manufacture, most often in a bezel bordering an edge of the display, though there are systems where the integrated camera is positioned behind the front surface of the display screen, with attendant complications for the manufacturing process and display operation. In other cases, the camera is not integrated but is part of a separate accessory, mounted retroactively on a frame of the display.

A key consideration for systems in current use is to ensure the webcam is not located in a direct light path between the subject's face and the main area of the display screen, to avoid obscuring the display for the subject, or significantly reducing its effective area. Unfortunately, this means that the webcam view is typically not a "natural" straightforward view, such as would be seen by a person actually facing the subject during conversation. If, for example, the camera is positioned near the center of the top edge of the subject's display screen, the subject's gaze direction would typically not be directed toward the camera lens but closer to the center of the display area, and an image stream captured by the camera would show the subject's eyes as seeming to be directed at a downward angle—not forward towards the viewer of the image stream. Similarly, if the camera is positioned below the display area, at the bottom edge of the screen, the subject would appear to a viewer of the captured image stream to be looking upwards.

The essence of the problem is that the large spatial separation between the webcam camera and the center of the display screen surface means that the speaker is not able to simultaneously direct their gaze to the camera and view their own display. They almost invariably choose the latter option, making the viewer very aware that the attention of the subject (or speaker) is directed at their own display, and not at the viewer. The appearance—the desirable fiction—of normal eye contact between speaker and viewer is not maintained.

In cases where the viewer is also facing a webcam, the speaker's display may show video of the viewer, and of course the speaker is similarly made aware that the viewer is looking at their own display screen, not at their own camera lens, so not (apparently) at the speaker. Again, there is no semblance of normal eye contact between the participants.

There is, therefore, a need to develop systems and methods that provide a more natural semblance of eye contact between remotely located participants interacting via one or more webcams, or in a recorded presentation, to provide a more natural semblance of eye contact with the presenter, without appreciably reducing the effective display area of the display screen, i.e. while maintaining high display visibility for all participants. Ideally, these methods would not be restricted to any particular make or model of the display screens in current widespread use, and the systems could be retrofitted (and may be removed if and when desired) rather than having to be built into the screens during manufacture.

SUMMARY

The present invention includes methods and structures that improve engagement between people interacting with each other via one or more webcams connected to display screens, by providing images that more accurately simulate real-life interactions involving eye contact.

In one embodiment, a webcam apparatus for use with a display screen having a display surface characterized by a display area, comprises: an image capture device characterized by an optical axis and a first footprint in a plane substantially perpendicular to the optical axis; an energy transfer device comprising: a first portion coupled to the image capture device; and a second portion, shaped and sized to allow attachment to an edge of the display screen, such that when so attached, the first portion either lies against and in contact with the display surface, or in a plane proximate and substantially parallel to the display surface. the image capture device is positioned so that an optical axis characterizing the image capture device is approximately aligned with a gaze direction of a user when the user faces the display screen to address a viewer of images of the user captured by the image capture device. The first portion of the energy transfer device is transparent at optical wavelengths, and has a second footprint in the plane substantially perpendicular to the optical axis of the image capture device. The first and second footprints are small relative to the display area.

In another embodiment, a webcam apparatus for use with a display screen having a display surface characterized by a display area, comprises an image capture device characterized by an optical axis and a first footprint in a plane substantially perpendicular to the optical axis. The image capture device comprises: a local receiver configured to receive power delivered through free space from a transmitter and deliver power to drive the image capture device; and a local transmitter configured to transmit image data from the image capturing device through free space to a receiver, The image capture device is configured to be attached to the display surface such that the optical axis is approximately aligned with a gaze direction of a user when the user faces the display screen to address a viewer of images of the user captured by the image capture device. The first footprint is small relative to the display area.

In yet another embodiment, a method of improving engagement between a user of a webcam apparatus, comprising an image capture device and an energy transfer device having a first portion coupled to the image capture device, and a second portion shaped and sized to allow attachment to an edge of a display screen, and a viewer of video images of the user captured by the webcam apparatus comprises: positioning the webcam apparatus relative to a display screen in front of the user, the display screen having a display surface characterized by a display area, such that: the image capture device and the first portion of the energy transfer device either lie against and in contact with the display surface, or in a plane proximate and substantially parallel to the display surface, with an optical axis characterizing the image capture device approximately aligned with a gaze direction of the user when the user is addressing the viewer as represented by the image capture device. The image capturing device is characterized by a first footprint in a plane substantially perpendicular to optical axis. The first portion of the energy transfer device is transparent at optical wavelengths, and has a second footprint in the plane substantially perpendicular to the optical axis of the image capture device. The first and second footprints are small relative to the display area.

BRIEF DESCRIPTION OF THE DRAWINGS

FIG. 1 illustrates front and side views showing deployment of an apparatus according to one embodiment of the present invention.

FIG. 2A is a front view of an apparatus according to one embodiment.

FIG. 2B is a side view of the apparatus shown in FIG. 2A.

DETAILED DESCRIPTION OF EMBODIMENTS

Figure 3B:
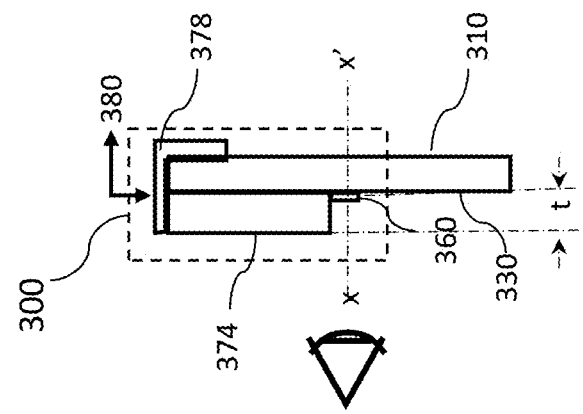
FIG. 3B is a side view of the deployed embodiment of FIG. 3A.

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure that other embodiments according to the present teaching that depart from the specific details disclosed herein remain within the scope of the appended claims. Moreover, descriptions of well-known apparati and methods may be omitted so as not to obscure the description of the example embodiments. Such methods and apparati are clearly within the scope of the present teachings. Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, otherwise noted, when a signal is said to be coupled to a device, this encompasses cases where one or more intermediate devices may be employed to couple the signal to the device. However, when a signal is said to be directly coupled to a device, this encompasses only cases where the signal is coupled to the device without any intermediate or intervening devices.

The manner in which the present invention provides its advantages can be most easily understood with reference to FIGS. 1 through 5B.

On the left side of FIG. 1 is a front view showing deployment of an apparatus 100 according to some embodiments of the present invention, while the right side of FIG. 1 shows a corresponding side view. Apparatus 100 includes an image capture device 160, coupled to one end of an image transfer device 170, the other end of 170 being configured to allow attachment to the display screen 110. In many cases, it is desirable for the attachment to be not only secure, but also reversible, by being shaped and sized to fit over a top edge of display screen 110 such that image transfer device 160 and a substantial portion of the energy transfer device lie in front of the display screen surface. In the case shown, device 160 is positioned roughly in the center of the screen's display area 140, defined as the area on which images can be displayed, an area that excludes bezels, edges or opaque borders 120. On the right side of FIG. 1, a side view shows that devices 160 and 170 lie in contact with the screen's front surface 130, but in other cases, not shown, there may be a small air gap between their back surfaces and the front surface of the screen, depending on the geometry of the end of the image transfer device distal to the image capture device in relation to the display screen.

In some embodiments, the distal end of the image transfer device may, for example, be L-shaped (as illustrated), or U-shaped, to rest or hook over the top of the frame of display screen, positioning image capture device 160 roughly halfway down the screen, where it is easy for the subject (represented here by eye 190) to look directly into it.

In some embodiments, one or more motors under programmatic or user control may be coupled to apparatus 100, moving it across the display screen to position the image capture and energy transfer devices as required.

Image capture device 160 is characterized by an optical axis xx' and a first footprint 165 in a plane substantially perpendicular to that optical axis, the footprint being indicated by diagonal hatching in FIG. 1A. This footprint is small relative to display area 140, so that only a small fraction of the surface display screen surface is "lost" from view due to the presence of the device in front of it. In some embodiments, the first footprint is less than or equal to 0.5% of the display area, meaning that at most 0.5% of the display pixels will be obscured. This is very easily achievable with current technologies. Recent advancements in miniature cameras have demonstrated video cameras with lateral footprints of the order of 1 mm$^2$. For even a modest sized display screen area of 10 inches width by 6 inches height, less than 0.003% of the total display area would be blocked.

In some embodiments, a slightly larger footprint may be acceptable, blocking as much as 2% of the display.

When webcam apparatus 100 is operational and deployed as shown, the gaze direction yy' of a user, represented by eye 190, will be roughly aligned with optical axis xx'.

Energy transfer device 170 has a first portion 174 coupled at or near one end (its lower end as shown in the figures) to image capture device 160, and a second portion 178 (shown at the top in the figures) which is shaped and sized to allow secure and easily reversible attachment to an edge of the display screen. When so attached, the first portion either lies against and in contact with the display surface, as shown, or in a plane proximate and substantially parallel to the display surface, leaving a small air gap, typically of the order of 1 mm or less, in-between. Throughout this disclosure, the word "proximate" is used with its standard meaning of "next" or "immediately preceding or following".

The first portion 174 of the energy transfer device 170 has a second footprint 176 in the plane substantially perpendicular to the optical axis of the image capture device, the footprint being indicated by vertical hatching in FIG. 1. The second footprint is small relative to the display area, in some embodiments being no more than 1% of that area. In the case of the exemplary display mentioned above, this means it must have an area of less than 387 mm$^2$, which is quite feasible with current technology.

The first portion 174 of the energy transfer device 170 is transparent at optical wavelengths, where optical wavelengths are defined as the range between 310 nm and 1100 nm, covering portions of the electromagnetic spectrum perceptible to the human eye, including some UV and IR as well as visible light, and "transparent" is defined to mean having a transparency of at least 20%. In some cases, where transparency is a function of orientation, it should be understood that the important feature is transparency to light traveling substantially perpendicular to the front surface plane of the display screen, when the energy transfer device is deployed as shown, and where the term "substantially perpendicular" is defined in this instance as referring to all angles within 45 degrees of the display surface normal vector.

It should be appreciated that there may not always be a sharp boundary between the two portions of energy transfer device 170, but that there may be a transitional area between them, small relative to the portions themselves. It should also be understood that the bracketed areas in the figures, corresponding to labels 174 and 178 are rough approximations, qualitatively indicating their relative positions and extents. In some cases, the lower end of 174 may not extend beyond the area on which image capture device 160 is attached, as illustrated in FIG. 1A, but terminate at a top edge of the image capture device. In some cases, where second portion 178 is U-shaped, the edge of 178 connected to 174 may extend downwards to cover part or all of the width of bezel 120 and even obscure a negligibly small part of the display area 130.

Energy transfer device 170 may be configured to provide electrical power from a power source to drive image capture device 160, or to carry image data from image capture device 160 to a receiver, or to do both. The power source may be located externally to web apparatus 100, for example in a module interposed between the image transfer device and interface 180, or be partially or fully integrated into the energy transfer device. Similarly, the receiver may be located externally to web apparatus 100, or be in a module interposed between the image transfer device and interface 180, or be partially or fully integrated into the image transfer device, or some combination of these.

In each case, the transfer involves interface 180 which connects to a personal computer, mobile computation device or other display and communications modalities used to process and transmit images to other viewers. For the purposes of this disclosure, the term "computer" is used to generically refer to computer, PC, laptop computer, smart phone, or other devices that contain video signal processing elements.

Webcam apparatus 100 (and corresponding apparatuses in the other embodiments described below) may include one or more additional sensing elements, such as a microphone for capturing audio, but these are omitted from the figures and the discussion, as such functionality is well known in prior art webcams.

FIG. 2A is a front view of an apparatus 200 according to a subset of embodiments of the embodiments described above, and FIG. 2B is a corresponding side view. Apparatus 200 comprises an image capture device 260, corresponding to device 160 described above, and an energy transfer device 270, corresponding to device 170 described above. In the particular embodiment illustrated, energy transfer device 270 comprises thin electrically conductive lines that form electrical transmission lines, providing electrical power to device 160 via positive voltage and ground lines, or carrying back positive and negative signals, according to an LVDS/CIS communications protocol, or both. The conductive lines may be embedded in a clear plastic substrate, such as acrylic, PMMA (polymethyl methacrylate), or polycarbonate, such that the resulting composite structure has usefully high transparency, as will now be explained.

In one typical example, the plastic substrate may be 700 microns thick, 7 mm wide, and 70 mm in length. The specific dimensions of the plastic structure supporting the electrical transmission lines within device 270 depend on factors including the desired placement position of the image capture device on the light emitting display, mechanical rigidity requirements of the webcam apparatus, and the mass, dimensions, and power consumption of the image capture device 260. The conductive lines may be comprised of copper or other conductive materials and may be fabricated in a web-like pattern to reduce individual conductive trace widths, increasing current capacity and optical transparency, correspondingly reducing blockage of images displayed on any display screen over which the energy transfer device is placed.

In some cases, not shown, a substrate of image transfer device 270 may support optically transparent conductors composed of Indium Tin Oxide (ITO) which is readily etched to form electrical transmission lines while maintaining optical transparency to allow a light-emitting display (such as display 130 in FIG. 1B) to communicate imagery to the subject's eye (see 190 in FIG. 1B). In other cases, different conductive materials may be employed as transparent conductors 170 and optimized according to a figure of merit, M, defined as the ratio of electrical conductivity, σ, to visible optical absorption, α:

$$M = -\{R_s \ln(T+R)\}^{(-1)}$$

$R_s$ is the sheet resistance with units of ohms per square and T and R are the total visible transmission and reflectance respectively. As optical loss goes to zero, T+R tends to unity and the natural logarithm of T+R tends to zero which results in a high figure of merit, M. that may be used to compare transparent conductor options. Similarly, as the electrical sheet resistance $R_s$ tends to zero, the figure of merit, M, takes on high values, for example greater than 3 for purposes of illustration. Materials such as ZnO:F, Cd2SnO4, ZnO:Al, and In2O3:Sn have high figures of merit, M and are suitable for use as a transparent conductor. Other suitable materials are well-known in the field and there are commonly used methods to attach these materials to substrates including atmospheric-pressure chemical vapor phase deposition, CVD, vacuum evaporation, magnetron sputtering, low-pressure CVD, sol-gel and pulsed laser deposition.

In yet other cases among the subset of embodiments of FIG. 2A, energy transfer device 270 of webcam apparatus 200 comprises a plastic or polymer material with transparent conductors that are part of a dielectric-metal-dielectric layered structure. In one example, RF-sputtered AlO and ZnO are used as dielectrics and a 6.5-nm-thick Cu-doped Ag DC-sputtered conductor layer may be used, with PET as a transparent substrate. This transparent conductor has demonstrated 88.4% optical transmission across the entire visible spectrum from 400 nm to 700 nm.

The electrical interface 280 may support low voltage differential signaling, LVDS, camera interface standards, CIS, or other standard, such as USB, or a proprietary interface for coupling electrical signals and power supplies from the conductors of transfer device 270 directly or indirectly to the computer used to provide power and receive video signals. FIG. 2B shows a hook-style mechanical attachment method to attach the on-display camera to the screen. One of ordinary skill in the art will appreciate that many variations of attachments, including adjustable positioning, and alternative orientations of a webcam apparatus with respect to light-emitting displays such as display 110 are possible.

Figure 3A:
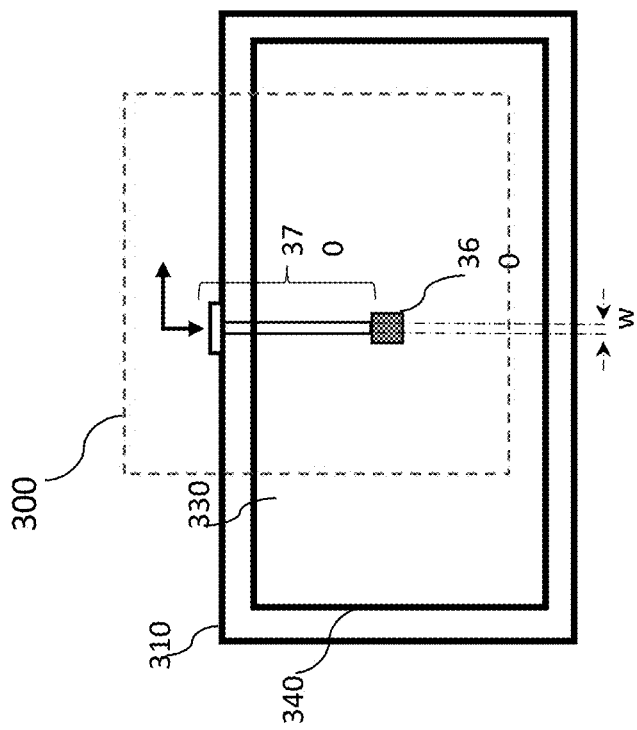
FIG. 3A is a front view showing deployment of an apparatus according to another embodiment of the present invention.

FIG. 3A is a front view showing deployment of an apparatus 300 according to some other embodiments of the present invention, with FIG. 3B showing a corresponding side view. Elements 310, 330 and 340 of the display, and elements of the apparatus such as image capture device 360, energy transfer device 370 with components 374 and 378 correspond to elements 110 130, 140, 160, 170, 174 and 178 in the embodiments of FIGS. 1A and 1B, and operate in essentially the same way, the significant difference relating to energy transfer device 370.

As in the case of apparatus 100, the first end 372 and the intermediate portion 374 of the energy transfer device 370 in apparatus 300 in combination have a second footprint that is small relative to the display area, in some embodiments being no more than 1% of that area, and they are transparent at optical wavelengths. In some other embodiments, a slightly larger footprint may be acceptable, blocking as much as 5% of the display, As in the case of device 170, device 370 comprises elements that convey electrical power from an external source to drive the image capture device, or carry image data from the image capture device to a receiver, or do both.

The significant difference between energy transfer devices 370 and 170 arises from the dimensions characterizing the first portion 374. While the figures are not drawn to scale, they should be understood as indicating that in the case of apparatus 100, the first portion 174 has a width w (in a plane substantially parallel to the surface of any display screen over which it is intended to lie) that is significantly greater than its thickness t in a direction substantially parallel to the optical axis of the image capture device, basically taking a strip-like form. Typical values of width and thickness may be 5 mm and 1 mm respectively. However, in the case of apparatus 300, the intermediate portion takes a fin-like form, being relatively narrow (see "w" in FIG. 3A) in a plane substantially parallel to the surface of any display screen over which it is intended to lie, but thick (see "t" in FIG. 3B) in a plane substantially perpendicular to that surface, including the gaze direction axis xx'. Typical values of width w and thickness t may be 2 mm and 5 mm respectively. The fin shape may be advantageous in having a reduced footprint in the plane of the display, blocking a smaller fraction of the display screen surface. This is achieved at the cost of protruding further out into space in front of the screen, in order to accommodate the volume necessary to house or support the elements necessary to achieve the energy transfer functions desired, but as most of the time the screen is viewed from directly in front rather than at a large angle to the surface normal, this protrusion is unlikely to significantly limit the subject's view of the screen.

Throughout this disclosure, except where explicitly noted otherwise, the terms "substantially perpendicular" and "substantially parallel" are used to mean "perpendicular within an angular range of +/−30 degrees" and "parallel within an angular range of +/−30 degrees" respectively to allow for practical deviations from the ideal.

As in the case of portion 174 in apparatus 100, portion 374 in apparatus 300 may be used to provide electrical power from an external source to drive the image capture device, or to carry image data from the image capture device to a receiver, or to do both; and it is transparent at optical wavelengths, to provide good visibility of images on the underlying display screen surface.

Figure 4:
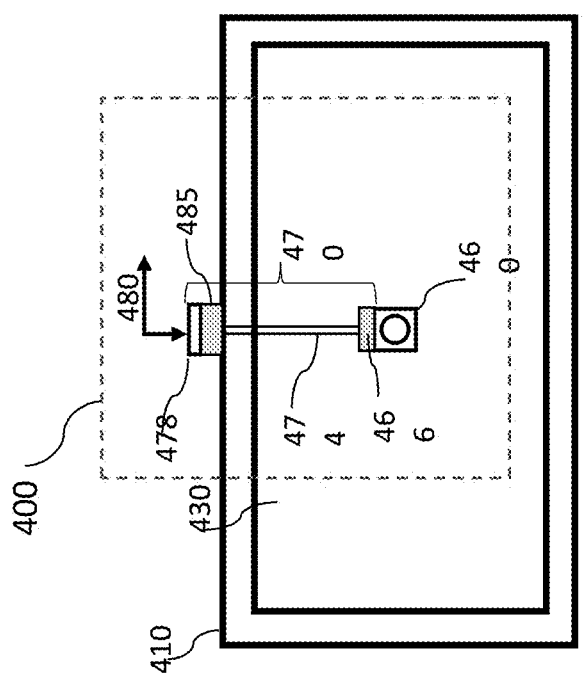
FIG. 4 is a front view showing deployment of an apparatus according to a third embodiment of the present invention.

FIG. 4 is a front view showing deployment of an apparatus 400 according to some embodiments of the present invention, in which first portion 474 of energy transfer device 470 comprises one or more optical waveguides, in the form of optical fibers or planar waveguides, that are used to transmit images, either via encoded optical signals, or via direct image transfer through a coherent fiber bundle, from image capture device 460. Such bundles are well known in the art, used, for example, in medical procedures such as endoscopy. A backing plastic substrate, transparent at optical wavelengths, may be employed to provide structural rigidity to whichever form of waveguide is used.

Consider the case where encoded optical signals are carried through 474. This involves the use of local transmitter 466 at one end of 474, proximal to the image capture device 460, and a receiver 485 at its other, distal end. Methods of communication using modulated light signals are well-known in the art of optical communications. Many low power consumption, compact light sources, including but not limited to vertical cavity surface emitting lasers, VCSELs, and light emitting diodes (LEDs), may be encoded to transmit video information. Local transmitter 466 comprises such a light source and its corresponding encoding circuitry. It may be present as a module coupled to both the proximal end of energy transfer device 470 and to image capture device 460 as shown, where 460 consists of little more than a lens and a sensor, or it may be integrated into either one of them, or both. In cases where 466 is a separate module, it would typically be positioned behind the image capture source, within the first footprint to avoid any additional blockage of the display screen, rather than alongside it as shown for simplicity in the figure. Receiver 485, comprising a photodetector and decoding circuitry, may be incorporated into the distal end of the first portion of energy transfer device 470, or it may be a separate module coupled thereto. The modulation information extracted is then passed on to interface 480 and provided as "normal" webcam output.

Now consider the alternative where device 474 comprises a coherent fiber bundle to passively convey an image stream of captured images, rather than a coded representation of those images. In these cases, image capture device 460 may be just a lens that focuses captured image onto the proximal end of the bundle, the distal end of which delivers the same image to a second image capture device (essentially a lens plus a sensor) in receiver 485. Receiver 465 may be a module coupled to both the distal end of energy transfer device 470 and to interface 480, or may be integrated into either one of them, or both.

The second portion 478 of energy transfer device 470 functions in the same way as 178, 278 etc. in embodiments discussed above, providing mechanical support and positioning.

Energy transfer to power image capture device 460 may also occur optically using other waveguides (not shown) in energy transfer device 474; in these cases, as described further below in the case of free space optical power delivery, image capture device 460 may operate in conjunction with, or incorporate, a local receiver—essentially a photodetector—for converting the received optical power into electrical power.

FIGS. 1A through 4 relate to embodiments in which a first portion (174, 274, etc.) of a physical energy transfer element is connected at or near one end to a device that can capture images of the speaker, and a second portion of the energy transfer element (at the opposite end) is shaped and sized to help position the image capturing device at a desired location, usually roughly central, on the display screen's front surface.

In these embodiments, that first portion of the physical element, which also plays a part in the desired positioning of the image capture device relative to the display screen, contains one or more components that act to either carry power to the image capture device or convey captured image data from the image capture device, or both. However, in those cases where the energy transfer device only provides a structure for the energy transfer to occur "one-way", energy may be conveyed separately in the other direction using a free space electromagnetic transmission method, bypassing the transfer device, based on optical and/or RF methods, using, for example, Bluetooth protocols. If, for example, the energy transfer device can only deliver power to drive the image capture device and cannot carry image data back, the captured image data may be sent to the receiver through a free space transmission method. Conversely, if the energy transfer device is used purely to carry image data from the image capture device to the interface 180, 280 etc. power may be sent through free space transmission technique to drive the image capture device.

As an illustrative example of a situation where power may have to be delivered to the image capture device of the webcam apparatus through free space, one webcam currently available commercially has a camera with a footprint of 1 mm×1 mm and a depth of 1.74 mm, uses low voltage differential signaling (LVDS), and has a maximum power dissipation of 4.7 mW at a supply voltage of 1.6 V. This level of power dissipation is readily supported by laser power transfer via free space propagation (though it may also occur via optical waveguides in the FIG. 4 embodiments discussed above) to provide power to the image capture device 460 which will incorporate a photodetector for converting the received optical power into electrical power. Compact semiconductor lasers are readily available that provide 100 mW or more of optical power and the quantum efficiencies above 50% are routinely available for silicon photodetectors allowing for powering an image capture device. Other compact optical sources, including LEDs, could in some cases provide sufficient power to be used for this purpose.

In some other embodiments, the energy needed to drive image capture may be delivered by a magnetic induction technique, where coils in the webcam apparatus create magnetic field induced current, supplying electrical power in the same ways now commonplace for charging watches or smart phones. The transmitting coils could be embedded in the light-emitting display provided the changing magnetic fields do not disturb the function of light-emitting display significantly. In other cases, the coils may be in a receiver module coupled to or incorporated into the energy transport device (like receiver 485 in FIG. 4) allowing for retrofitting and possibly reversible attachment to the frame of the display.

Figure 5B:
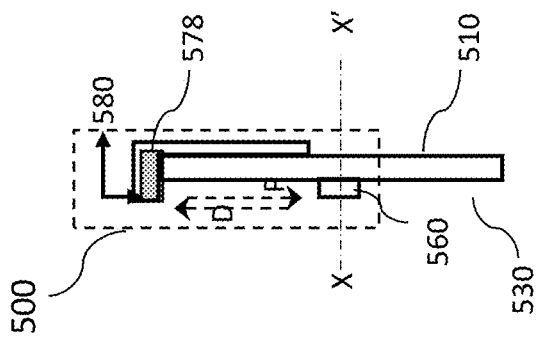
FIG. 5B is a side view of the deployed embodiment of FIG. 5A.
Figure 5A:
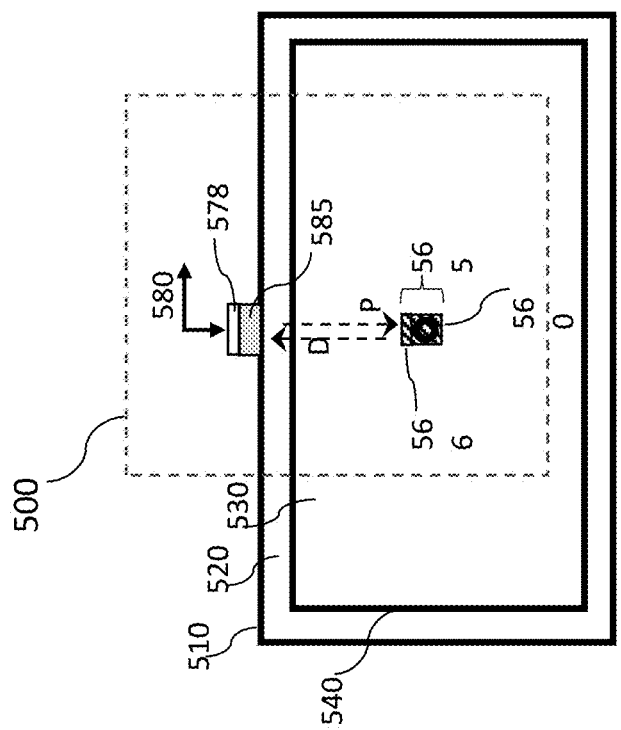
FIG. 5A is a front view showing deployment of an apparatus according to a fourth embodiment of the present invention.

FIG. 5A is a front view showing deployment of an apparatus 500 according to another group of embodiments of the present invention, with FIG. 5B showing a corresponding side view. In these embodiments, there is no energy transfer structure present that physically connects at one end to the image capture device and at the other to either a transmitter of power or a receiver. Instead of this, the image capture device 560 receives power through free space from a transmitter and delivers image data through free space to a receiver, where the transmitter and receiver are positioned closely enough to 560 to keep transmission losses low during passage to and from the image capture device, but at locations that avoid unduly blocking the speaker's view of the screen. The transmitter and receiver may be integrated into a transceiver module 585, which is positioned near an edge of the display screen 510 as shown, or embedded into the bezel 520; alternately, they may be in separate transmitter and receiver modules, again close to the image capture device 560, and arranged to minimize obscuring the display screen surface 530. In some cases, the module 585 may be held in place with the help of a supporting mechanism 578, like 178, 278 etc.

In apparatus 500, the image capture device is not attached to any energy transfer device, but comprises a local receiver configured to receive power delivered through free space from the and deliver power to drive the image capture device; and a local transmitter configured to transmit image data from the image capturing device through free space to the receiver. In the illustrated case, drive power P is sent to it from the transmitter in module 585, while the receiver in module 585 receives image data D.

The various options discussed above with respect to FIGS. 4A and 4B, of using wireless RF, magnetic induction, or free space optical technology to send power to an image capture device apply equally well to FIG. 5. In the case of optical power delivery, this requires that the local receiver coupled to or incorporated within image capture device 560 will include a photodetector.

Similarly, the flow of data back from the image capture device to ultimately reach interface 580 may occur using RF, magnetic induction, or optical technology, implemented by the local transmitter. In the illustrated case, the local receiver and local transmitter take the form of a single local module 566, connected to the image capture device, though in other cases, they may be in separate modules, or one or both may be incorporated into image capture device 560. In all cases where they are not so incorporated, they would preferably be positioned behind the device to avoid increasing the effective footprint, rather than adjacent the image capture device, as shown in the figure for convenience.

Image capture device 560 is characterized by an optical axis XX', and is characterized by a first footprint 565 in a plane substantially perpendicular to that optical axis, the footprint being indicated by diagonal hatching in FIG. 5A. Assuming incorporation of the local transmitter and receiver for simplicity, we can take the first footprint as being the only footprint of relevance. This footprint is small relative to display area 540, so that only a small fraction of the surface display screen surface 530 is "lost" from view due to the presence of the device in front of it. In some embodiments, the first footprint is less than or equal to 0.5% of the display area, meaning that at most 0.5% of the display pixels will be obscured. The various considerations discussed above with respect to device 160 apply similarly to 560. In other cases, where the local transmitter/receiver are not incorporated, their contribution to the effective footprint would also have to be taken into account.

In the absence of a physical structure extending between an edge of display screen 510 and image capture device 560 to achieve the desired positioning of the latter without increasing its effective footprint, means as simple as a double-sided adhesive pad on the back surface of 560, or a transparent plastic support structure (that does not include or support any conductors) may be employed.

In some other embodiments of the present invention, multiple subject image capture devices may be placed at different points on the subject's display, providing the option to select which view of the speaker is preferred to maintain best eye contact with a particular viewer observing the speaker on their own display. This option may be helpful when the speaker is viewing a large display.

In all the embodiments discussed above, antireflection technology, for example using dielectric coatings, well known in the art, may be used to reduce reflections due to the difference in optical refractive index between the air and the materials used in the construction of the webcam apparatus. In all embodiments where light from light emitting display passes through portions of the webcam apparatus, the use of materials with low index of refraction in those portions will reduce optical distortion effects at their boundaries.

Embodiments described herein provide various benefits. In particular, embodiments enable a user to improve engagement between viewers and subjects of webcam-captured video communications, by presenting a more natural semblance of eye contact without undue blockage of subjects' display screens.

Although the description has been described with respect to particular embodiments thereof, these particular embodiments are merely illustrative, and not restrictive. It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A webcam apparatus for use with a display screen having a display surface characterized by a display area, the webcam apparatus comprising:
   an image capture device characterized by an optical axis and a first footprint in a plane perpendicular to the optical axis;
   an energy transfer device comprising:
      a first portion coupled to the image capture device; and
      a second portion, shaped and sized to allow attachment to an edge of the display screen, such that when so attached, the first portion either lies against and in contact with the display surface, or in a plane proximate and substantially parallel to the display surface, and the image capture device is positioned so that an optical axis characterizing the image capture device is aligned with a gaze direction of a user when the user faces the display screen to address a viewer of images of the user captured by the image capture device;
   wherein the first portion of the energy transfer device is transparent at optical wavelengths, and has a second footprint in the plane perpendicular to the optical axis of the image capture device; and
   wherein the first and second footprints are small relative to the display area.

2. The webcam apparatus of claim 1, wherein the first footprint is less than or equal to 2% of the display area.

3. The webcam apparatus of claim 1, wherein the second footprint is less than or equal to 5% of the display area.

4. The webcam apparatus of claim 1, wherein the first portion of the energy transfer device comprises transparent electrical conductors configured to carry electrical power from a power source to drive the image capture device.

5. The webcam apparatus of claim 1, wherein the first portion of the energy transfer device comprises one or more transparent elements configured to carry image data from the image capture device to a receiver.

6. The webcam apparatus of claim 5, wherein the image data comprise video signals at one or more optical wavelengths; and wherein the one or more transparent elements comprise one or more optical waveguides.

7. The webcam apparatus of claim 5, wherein the image data comprise video data coded and carried by electrical signals; and wherein the one or more transparent elements comprise one or more electrical conductors.

8. A webcam apparatus for use with a display screen having a display surface characterized by a display area, the webcam apparatus comprising:
   an image capture device characterized by an optical axis and a first footprint in a plane perpendicular to the optical axis, the image capture device comprising:
      a local receiver configured to receive power delivered through free space from a transmitter and deliver power to drive the image capture device; and
      a local transmitter configured to transmit image data from the image capturing device through free space to a receiver;
   wherein the image capture device is configured for attachment to the display surface such that the optical axis is aligned with a gaze direction of a user when the user faces the display screen to address a viewer of images of the user captured by the image capture device; and
   wherein the first footprint is small relative to the display area.

9. The webcam apparatus of claim 8,
wherein the transmitter comprises a laser; and
wherein the local receiver comprises a photodetector converting optical power, received from the laser, to electrical power to drive the image capture device.

10. The webcam apparatus of claim 8,
wherein the transmitter comprises an RF power source; and
wherein the local receiver comprises an RF receiver, converting received RF power to electrical power to drive the image capture device.

11. The webcam apparatus of claim 8,
wherein the local receiver comprises a photodetector; and
wherein the local transmitter transmits image data comprising video signals at one or more optical wavelengths to the receiver.

12. The webcam apparatus of claim 8,
wherein the receiver comprises an RF receiver; and
wherein the local transmitter transmits image data comprising video data coded and carried by RF signals to the RF receiver.

13. The webcam apparatus of claim 8,
wherein the first footprint is less than or equal to 2% of the display area.

14. A method of improving engagement between a user of a webcam apparatus, comprising an image capture device and an energy transfer device having a first portion coupled to the image capture device and a second portion shaped and sized to allow attachment to an edge of a display screen, and a viewer of video images of the user captured by the webcam apparatus; the method comprising:
positioning the webcam apparatus relative to the display screen in front of the user, the display screen having a display surface characterized by a display area, such that:
the first portion of the energy transfer device either lies against and in contact with the display surface, or in a plane proximate and substantially parallel to the display surface, with an optical axis characterizing the image capture device aligned with a gaze direction of the user when the user is addressing the display screen;
wherein the image capturing device is characterized by a first footprint in a plane perpendicular to the optical axis;
wherein the first portion of the energy transfer device is transparent at optical wavelengths, and has a second footprint in the plane perpendicular to the optical axis of the image capture device; and
wherein the first and second footprints are small relative to the display area.

15. The method of claim 14,
wherein the first footprint is less than or equal to 2% of the display area.

16. The method of claim 14,
wherein the second footprint is less than or equal to 5% of the display area.

17. The method of claim 14,
wherein the first portion of the energy transfer device comprises one or more transparent electrical conductors configured to carry electrical power from a transmitter to drive the image capture device.

18. The method of claim 14,
wherein the first portion of the energy transfer device comprises one or more transparent elements configured to carry image data from the image capture device to a receiver.

19. The method of claim 18,
wherein the image data comprise video signals at one or more optical wavelengths; and
wherein the one or more transparent elements comprise one or more optical waveguides.

20. The method of claim 18,
wherein the image data comprise video data coded and carried by electrical signals; and
wherein the one or more transparent elements comprise one or more electrical conductors.

\* \* \* \* \*